United States Patent [19]

Takase

[11] 4,454,845
[45] Jun. 19, 1984

[54] DATA SAMPLING SYSTEM FOR ELECTRONIC ENGINE CONTROLLERS

[75] Inventor: Sadao Takase, Yokohama, Japan

[73] Assignee: Nissan Motor Company, Limited, Yokohama, Japan

[21] Appl. No.: 315,611

[22] Filed: Oct. 28, 1981

[30] Foreign Application Priority Data

Oct. 30, 1980 [JP] Japan ................. 55-151496

[51] Int. Cl.³ .............................. F02M 51/00
[52] U.S. Cl. .................... 123/478; 123/416; 123/487
[58] Field of Search ............... 123/478, 486, 487, 488, 123/480, 414, 416, 425, 435

[56] References Cited

U.S. PATENT DOCUMENTS

| | | | |
|---|---|---|---|
| 4,114,573 | 9/1978 | Mori | 123/416 |
| 4,128,885 | 12/1978 | Valek et al. | 123/416 |
| 4,175,506 | 11/1979 | Sakamoto et al. | 123/416 |
| 4,345,561 | 8/1982 | Kondo et al. | 123/487 |
| 4,354,239 | 10/1982 | Kanegae | 123/487 |
| 4,355,614 | 10/1982 | Hayashi et al. | 123/488 |

*Primary Examiner*—Parshotam S. Lall
*Attorney, Agent, or Firm*—Schwartz, Jeffery, Schwaab, Mack, Blumenthal & Koch

[57] ABSTRACT

An electronic engine controller is disclosed for controlling selected operations of an internal combustion engine based upon engine operating parameters. The engine controller comprises a load sensor for generating an analog signal indicative of the value of engine load, and an A/D converter for converting the engine load indicative analog signal into digital form. The A to D conversion is synchronized with engine rotation by a data sampling circuit which includes a first circuit for determining, based upon engine speed, a desired position of an engine crankshaft with respect to an engine crankshaft reference position, and a second circuit responsive to the engine crankshaft rotating to the determined engine crankshaft position for providing a command signal to the A/D converter which thereby initiates the A to D conversion process.

12 Claims, 5 Drawing Figures

DATA SAMPLING SYSTEM FOR ELECTRONIC ENGINE CONTROLLERS

BACKGROUND OF THE INVENTION

This invention relates to an electronic engine controller for controlling engine operations based upon various engine operating parameters and, more particularly, to a data sampling system for use in such an engine controller for synchronizing the A to D conversion of an analog signal indicative of engine load with engine rotation.

To achieve fuel economy, reduced unwanted exhaust emissions and improved engine performance and drivability, it is desirable to accurately control the various operations of an internal combustion engine such as spark timing, fuel metering and idle speed. Because of improved accuracy and lower costs, digital engine controllers have recently been proposed for controlling the various engine operations based upon existing engine operating parameters such as engine load, engine speed, engine coolant temperature, etc. A true indication of engine load may be obtained by the measurement of both engine speed and output torque, but a satisfactory sensor for measuring engine output torque is not available at this time. Because of this, it is the common practice to provide an inference of engine load by sensing the mass air flow into the engine or the absolute pressure within the engine intake manifold.

The measurement of mass air flow into the engine may be made by the use of an airflow meter such as a hot-wire airflow meter and a Karman's vortex shedding airflow meter which generates an analog signal indicative of mass air flow rate into the engine. The measurement of intake manifold absolute pressure may be made by the use of a pressure sensor including a piezo-electric element which generates an analog signal indicative of absolute pressure within the intake manifold. Such load sensors are very high in sensitivity and response to variations in conditions to be sensed. Thus, they are effective to sense transient engine operating conditions although they are sensitive to vacuum pulsations transmitted thereto under high load conditions where the engine is operated at or near full throttle. In order to avoid the limitations and drawbacks inherent in such load sensors, it is preferable to measure the average value of mass air flow rate into the engine or intake manifold absolute pressure over one intake stroke.

The analog signal indicative of engine load as inferred from measurement of mass air flow rate into the engine or intake manifold absolute pressure has to be converted into digital form for processing by a digital computer adapted to control the engine as a function of engine load. In the engine controllers of the prior art, the analog-to-digital conversion process is initiated, at predetermined intervals, on command from the digital computer. Thus, the converted digital value indicative of engine load does not represent the average value of engine load over one intake stroke. Particularly when the engine is operating at or near full throttle, large errors are introduced into the engine load measurement to cause improper fuel metering and spark timing control, spoiling fuel economy and exhaust emission purifying performance.

The present invention provides an electronic engine controller which can assure proper engine operation control so as to achieve fuel economy, reduced unwanted exhaust emissions and improved engine performance and drivability. The engine controller includes a data sampling system capable of sampling the value indicative of engine load in synchronism with engine rotation so that the sampled engine load value represents the average value of engine load over each intake stroke.

SUMMARY OF THE INVENTION

There is provided, in accordance with the present invention, an electronic engine controller for controlling at least one selected operation of an internal combustion engine based upon engine operating parameters. The engine controller comprises a load sensor for sensing engine load and generating an analog signal indicative of the value of engine load, a speed sensor for sensing engine speed and generating a signal indicative of the value of engine speed, a reference pulse generator for sensing predetermined engine crankshaft reference position and generating reference electrical pulses every predetermined number of degrees of rotation of an engine crankshaft. The engine controller also comprises a data sampling circuit which includes first means for determining, from the sensed value of engine speed, a desired position of the engine crankshaft with respect to the engine crankshaft reference position, and second means associated with the first means. The second means is adapted to provide the command signal to the A/D converter when the engine crankshaft rotates to the determined engine crankshaft position.

The first means may be designed to determine, from the sensed value of engine speed, an angle value indicative of the number of degrees of the angular distance of the determined engine crankshaft position from the engine crankshaft reference position. In this case, the second means is designed to provide the command signal to the A/D converter when the engine crankshaft rotates the determined angle value from the engine crankshaft reference position. Preferably, the second means comprises means for generating crankshaft position electrical pulses every degree of rotation of the engine crankshaft, a register into which the determined angle value is loaded, a counter responsive to each of the reference electrical pulses for starting to count the crankshaft position electrical pulses, and a comparator for providing the command signal to the A/D converter when the value of the counter reaches the angle value loaded in the register.

Alternatively, the first means may be designed to determine, from the sensed value of engine speed, a time value indicative of the time during which the engine crankshaft rotates from the crankshaft reference position to determined engine crankshaft position. In this case, the second means is designed to provide the command signal to the A/D converter when the engine crankshaft rotates for the determined time value from the engine crankshaft reference position. Preferably, the second means comprises means for generating clock pulses, a register into which the determined time value is loaded, a counter responsive to each of the reference electrical pulses for starting to count the clock pulses, and a comparator for providing the command signal to the A/D converter when the value of the counter reaches the time value loaded in the register.

BRIEF DESCRIPTION OF THE DRAWINGS

The present invention will be described in greater detail by reference to the following description taken in connection with the accompanying drawings, in which.

DESCRIPTION OF THE PREFFRRED EMBODIMENTS

Figure 1:
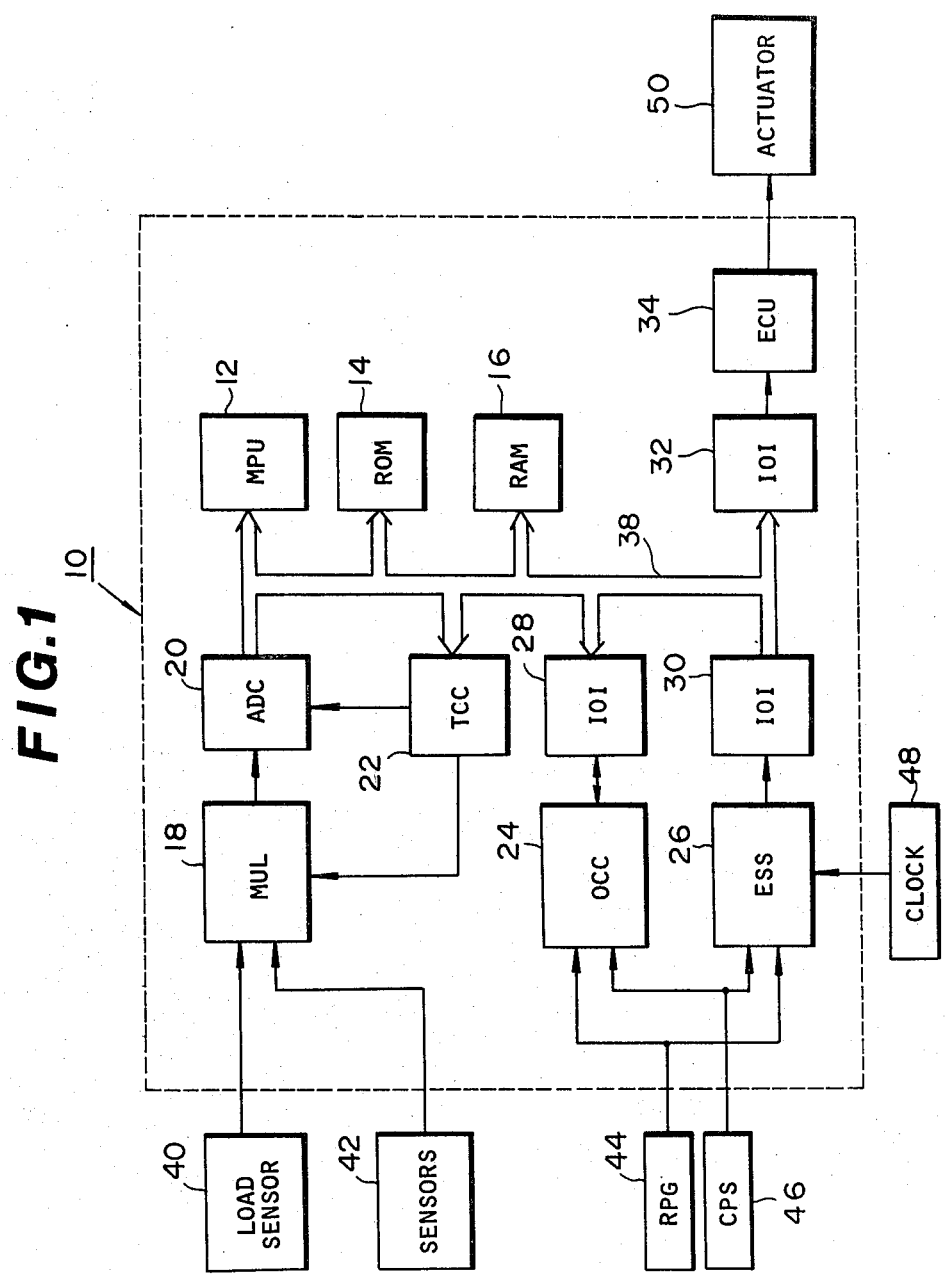
FIG. 1 is a block diagram showing an electronic engine controller made in accordance with one embodiment of the present invention.

Referring now to the drawings and initially to FIG. 1, the engine control system of the present invention, which is generally designated by reference numeral 10, includes a digital computer having a microprocessor (MPU) 12, a read only memory (ROM) 14 and a read/write memory (RAM) 16, a multiplexer (MUL) 18, an A/D converter (ADC) 20, a timing control curcuit (TCC) 22, an offset control curcuit (OCC) 24, an engine speed sensor (ESS) 26, I/O interface circuits (IOI) 28, 30 and 32, and an engine control unit (ECU) 34.

The multiplexer 18 has an input from a load sensor 40 which may be taken in the form of an airflow meter adapted to generate an analog signal indicative of mass air flow rate into the engine. Alternatively, the load sensor 40 may be taken in the form of a pressure sensor adapted to generate an analog signal indicative of absolute pressure within the engine intake manifold. The signal from the airflow meter or from the pressure sensor is indicative of an inference of engine load. The multiplexer 18 also has inputs from various sensors 42 including an ambient temperature sensor, an engine coolant temperature sensor, a vehicle battery voltage sensor, and perhaps other sensors adapted to provide analog signals indicative various engine operating parameters necessary for engine operation control.

The multiplexer 18 transfers a selected input signal to the A/D converter 20. Which one of the analog signals applied to the input of the multiplexer 18 is to be supplied to the A/D converter 20 is determined on command through the timing control circuit 22 from the MPU 12. The A/D converter 20 converts the selected analog signal into a digital signal which is read through a bi-directional data bus 38 into the RAM 16. The analog-to-digital conversion process is initiated on command through the timing control circuit 22 from the MPU 12 which selects the input channel to be converted.

The reference numeral 44 designates a refernce pulse genator (RPG) for generating a reference electrical pulse at a predetermined number of degrees, for example 120 degrees for a 4-cycle, 6-cylinder engine, of rotation of the engine crankshaft. The reference numeral 46 designates a crankshaft position sensor (CPS) for producing a series of crankshaft position electrical pulses, each corresponding to one degree of rotation of the engine crankshaft, at a repetition rate directly proportional to engine speed. The reference pulse generator 44 and the crankshaft position sensor 46 may be drivingly associated with an engine crankshaft or a distributor. The reference electrical pulses and the crankshaft position electrical pulses are applied to the offset control circuit 24 and also to the engine speed sensor 26.

The engine speed sensor 26 makes measurement of engine speed by counting clock pulses from a clock 48 for the period of the reference electrical pulses fed thereto from the reference pulse generator 44, or counting the crankshaft position electrical pulses fed thereto from the crankshaft position sensor 46 for a predetermined period of time. The measurement of engine speed is read into the RAM 16 through the I/O interface 30 and the data bus 38.

The offset control circuit 24 provides an interrupt through the I/O interface 28 to the MPU 12 when the engine crankshaft rotates an offset angle after a reference electrical pulse occurs at the output of the reference pulse generator 44; that is, after the engine crankshaft comes to the crankshaft reference position. In response to the interrupt from the offset control circuit 24, the MPU 12 drives the multiplexer 18 and the A/D converter 20 through the timing control circuit 22 to initiate the A to D conversion of the analog signal from the load sensor 40.

Figure 2:
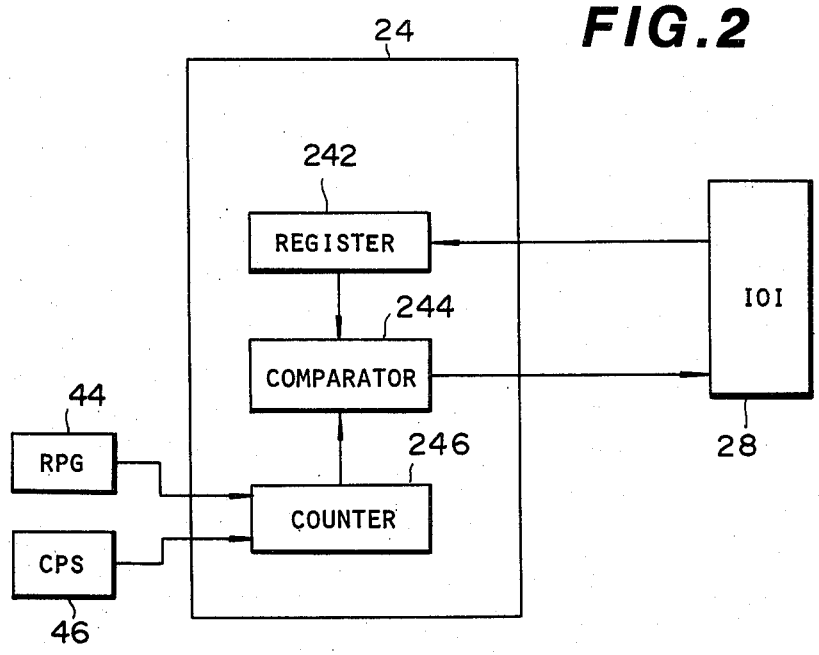
FIG. 2 is a block diagram showing the detailed structure of the offset control circuit used in the electronic engine controller of FIG. 1.
Figure 3:
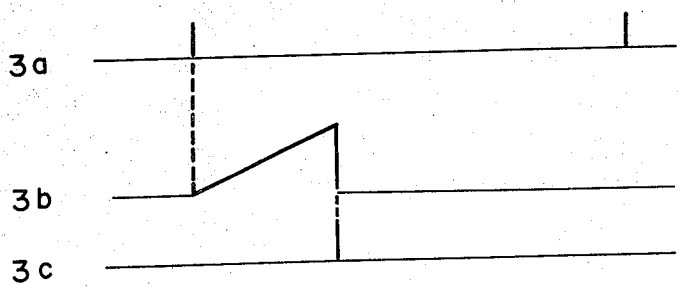
FIG. 3 contains three waveforms 3a, 3b and 3c obtained at various points in the schematic diagram of FIG. 2.

Referring to FIGS. 2 and 3, the offset control circuit 24 will be described in greater detail. The offset control circuit includes a register 242, a comparator 244, and a counter 246. FIG. 3 contains three waveforms drawn on the same time scale. FIG. 3a illustrates the reference electrical pulse output produced by the reference pulse generator 44, FIG. 3b illustrates variations in the value of the counter 246, and FIG. 3c illustrates the output of the comparator 244.

The MPU 12 determines the timing of the engine load indicative value being sampled; that is, the timing of the engine load indicative analog signal being converted into digital form. For this purpose, the MPU 12 determines, from the sensed value of engine speed, the position of the engine crankshaft with respect to the engine crankshaft reference position detected by the generation of a reference electrical pulse at the reference pulse generator 44.

In one embodiment of the present invention, the MPU 12 determines, from the sensed value of engine speed, an offset angle value indicative of the number of degrees of the angular distance of the determined engine crankshaft position from the engine crankshaft reference position. The MPU 12 loads the determined offset angle value into the registor 242 through the I/O interface 28. The counter 246 starts counting the crankshaft position electrical pulses applied thereto from the crankshaft position sensor 46 in response to a reference electrical pulse applied thereto from the reference pulse generator 44, as shown in FIGS. 3a and 3b. When the value of the counter 246 reaches the offset angle value loaded in the register 242, the comparator 244 generates an interrupt, as shown in FIGS. 3b and 3c, which is applied through the I/O interface 28 to the MPU 12.

Referring back to FIG. 1, the MPU 12 determines, based upon the stored data indicative of sensed engine operating parameters, a desired spark timing and/or fuel-injection duration which are transferred through the I/O interface 32 to the engine control unit 34 which thereby controls the operation of actuator means 50 such as an ignition coil and fuel injection valve(s) so as to achieve the desired ends of fuel economy, reduced emissions and improved drivability. The MPU 12 operates in accordance with a program based upon the values read into the RAM 16. The program is stored in the ROM 14.

The operation of the engine control system of the present invention will now be described. The engine speed sensor 26 provides a signal indicative of engine speed through the I/O interface 30 to the digital computer. The data representing the engine speed is loaded by the MPU 12 into the RAM 16. The loaded data is a binary representation of the number of clock pulses counted for the period of the reference electrical pulse signal or of the number of crankshaft position pulses counted for a predetermined period of time. The MPU 12 determines an optimum value of offset angle based upon the loaded engine speed data and loads the determined offset angle value through the I/O interface 28 into the register 242 of the offset control circuit 24. The counter 246 is responsive to each crankshaft position electrical pulse to start counting the reference electrical pulses. When the value of the counter 246 reaches the offset angle value loaded in the register 242, the comparator 244 provides an interrupt through the I/O interface 28 to the MPU 12 which thereby drives the timing control circuit 22. Consequently, the timing control circuit 22 causes the multiplexer 18 to transfer the selected analog signal from the load sensor 40 to the A/D converter 20 and also the A/D converter 20 to initiate the A to D conversion of the engine load indicative analog signal into a digital signal. The converted digital signal is fed through the data bus 38 to the digital computer. The MPU 12 loads the input engine load data into the RAM 16.

Figure 4:
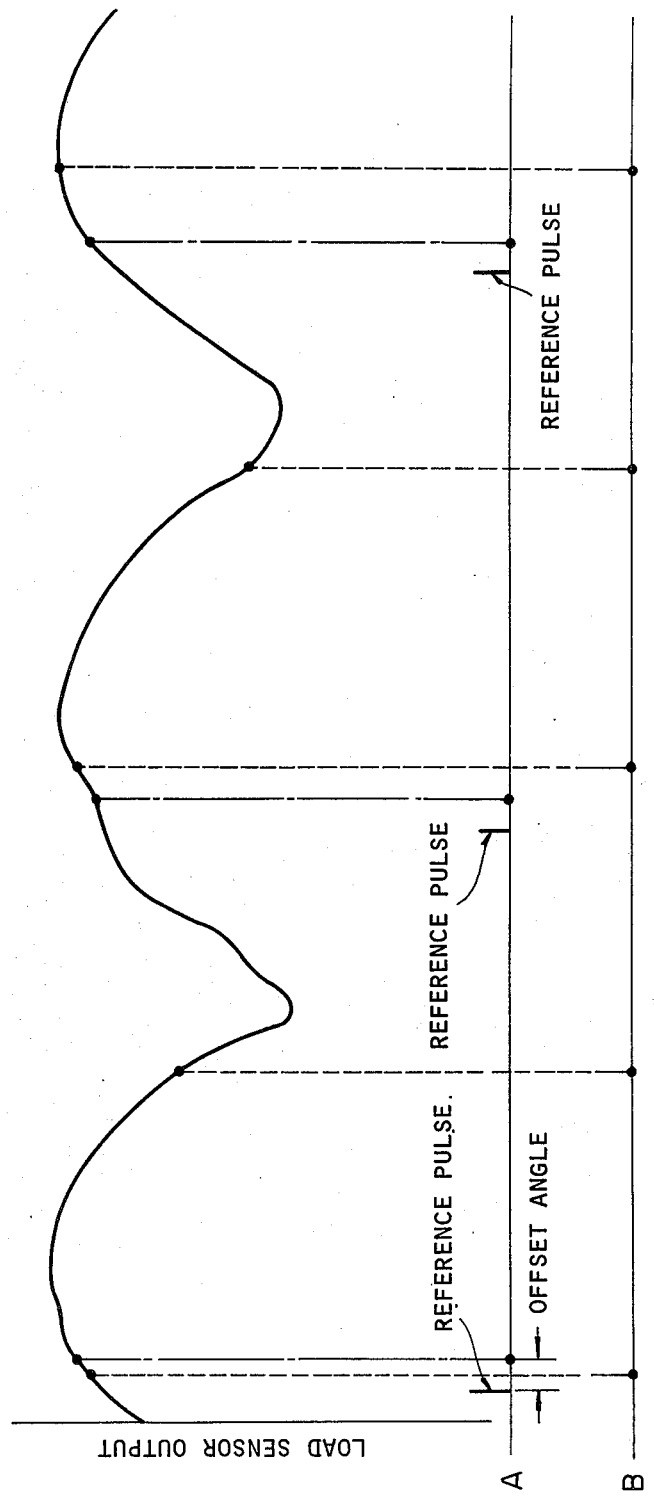
FIG. 4 is a graph of time versus load sensor output showing the timing of the value of engine load being sampled.

It will be seen from the foregoing that the output of the load sensor 40 can be sampled in synchronism with rotation of the engine. The load sensor output can also be sampled every desired number of degrees of rotation of the engine crankshaft from the reference crankshaft position corresponding to the generation of a reference electrical pulse from the reference pulse generator 44. This permits sampling of the average value of engine load over each intake stroke of the engine. This is illustrated in the diagram of FIG. 4 wherein the points on line A indicate the time at which the output of the load sensor 40 is sampled. In FIG. 4, the points on line B indicate the time at which the load sensor output is sampled with the prior art systems wherein it is sampled at predetermined intervals.

For the analog signals indicative of ambient air temperature, engine coolant temperature, vehicle battery voltage, etc. from the sensors 42, there is no need to initiate the analog-to-digital conversion in synchronism with rotation of the engine. Therefore, the A to D conversion process may be initiated on command from the MPU 12 by using a pulse signal of a predetermined period from a conventional timer circuit (not shown) to the MPU 12 so that the analog signals from the sensors 42 to the multiplexer 18 can be, one by one, converted by the A/D converter 20 and read into the RAM 16 thrugh the data bus 38.

The MPU 12 determines a desired spark timing and/or fuel-injection duration based upon the data stored in the RAM 16. The determined spark timing and/or fuel-injection duration are transfered through the I/O interface 32 to the engine control unit 34 which thereby controls the operation of the actuator means 50 such as an ignition coil and fuel injection valve(s) so as to achieve the desired ends of fuel economy, reduced emissions and improved drivability.

Figure 5:
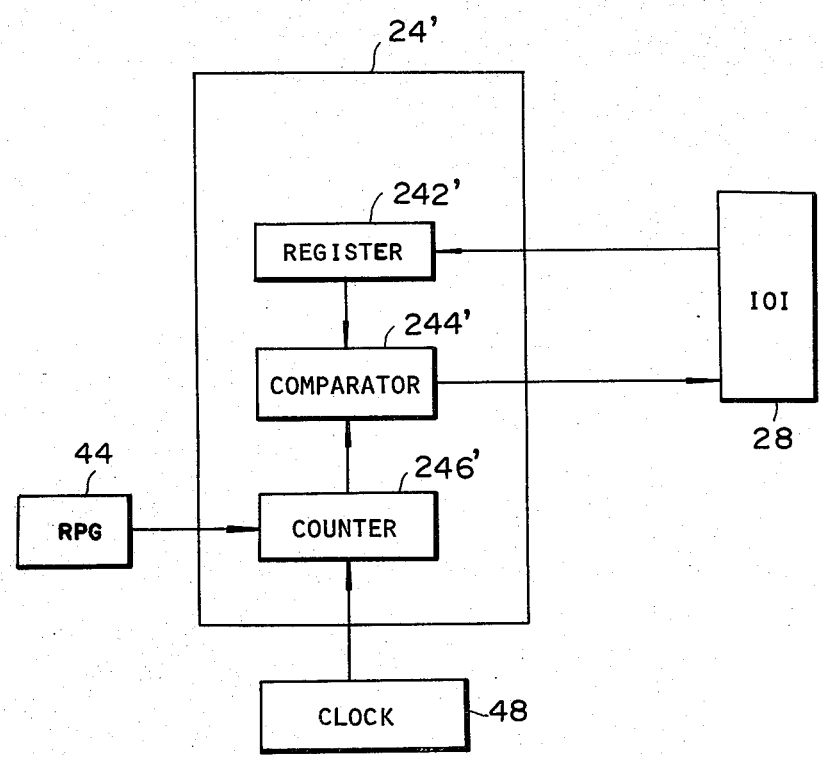
FIG. 5 is a block diagram showing an alternative arrangement of the offset control circuit used in the electronic engine controller of FIG. 1.

Referring now to FIG. 5, an alternative embodiment of the present invention will be described with is basically similar to that described in relation to FIGS. 1 and 2 and similar parts have been given the same reference numeral. In this embodiment, the MPU 12 determines, from the sensed value of engine speed, an offset time value indicative of the time during which the engine crankshaft rotates from the crankshaft reference position to the engine crankshaft position determined by the MPU 12.

The offset control circuit 24' includes a registor 242', a comparator 244', and a counter 246'. The MPU 12 determines, from the engine speed indicative data provided from the engine speed sensor 26 and read into the RAM 16, a desired offset time value corresponding to the time during which the engine crankshaft rotates the desired offset angle determined in the first embodiment by the MPU 12. The MPU 12 loads the determined offset time value into the registor 242' through the I/O interface 28. The counter 246' starts counting clock pulses from the clock 48 in response to a reference electrical pulse applied thereto from the reference pulse generator 44. When the value of the counter 246' reaches the offset time value loaded in the registor 242', the comparator 244' generates an interrupt which is fed through the I/O interface 28 to the MPU 12 which thereby drives the timing control circuit 22. Consequently, the timing control circuit 22 causes the multiplexer 18 to transfer the selected analog signal from the load sensor 42 to the A/D converter 20 and also the A/D converter 20 to initiate the A to D conversion of the engine load indicative analog signal into a digital signal. The converted digital signal is fed through the data bus 38 to the digital computer. The MPU 12 loads the input engine load data into the RAM 16.

It is, therefore, apparant that there has been provided, in accordance with this invention, an engine control system capable of sampling an engine load indicative signal every desired number of degrees of rotation of the engine crankshaft from a reference crankshaft position. The engine load data obtained by the engine control system is free from the influence of vacuum pulsations which occur particularly at or near full throttle and is accurate to assure proper engine operation control so as to achieve fuel economy, reduced unwanted exhaust emissions and improved engine performance and drivability. While this invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An electronic engine controller for controlling at least one selected operation of an internal combustion engine based upon engine operating parameters, comprising:
    (a) a load sensor for sensing engine load and generating an analog signal indicative of an existing value of engine load;
    (b) a speed sensor for sensing engine speed and generating a signal indicative of an existing value of engine speed;
    (c) a reference pulse generator for pulse when an engine crankshaft reaches a reference position;

(d) an A/D converter responsive to a command signal for converting said analog signal indicative of engine load into a corresponding digital signal; and
(e) a control circuit including:
first means for determining from said signal indicative of engine speed, an offset angular position in the rotation of said engine crankshaft with respect to said engine crankshaft reference position; and
second means associated with said first means for providing said command signal to A/D converter when said engine crankshaft rotates to said determined offset angular position.

2. The electronic engine controller of claim 1, wherein said first means is effective for determining, from said sensed value of engine speed, an angle value indicative of the number of degrees of the angular distance of said determined offset angular position from said engine crankshaft reference position, and said second means is effective for providing said command signal to said A/D converter when said engine crankshaft rotates said determined angle value from said engine crankshaft reference position.

3. The electronic engine controller of claim 2, wherein said second means comprises means for generating crankshaft position electrical pulses every degree of rotation of said engine crankshaft, a register into which said determined angle value is loaded, a counter responsive to said reference pulse for starting counting said crankshaft position electrical pulses, and a comparator for providing said command signal to said A/D converter when the value of said counter reaches said angle value loaded in said register.

4. The electronic engine controller of claim 1, wherein said first means is effective for determining, from said sensed value of engine speed, a time value indicative of the time during which said engine crankshaft rotates from said crankshaft reference position to said determined offset angular position, and said second means is effective for providing said command signal to said A/D converter when said engine crankshaft rotates for said determined time value from said engine crankshaft reference position.

5. The electronic engine controller of claim 4, wherein said second means comprises means for generating clock pulses at predetermined time intervals, a register into which said determined time value is loaded, a counter responsive to said reference pulse for starting counting said clock pulses, and a comparator for providing said command signal to said A/D converter when the value of said counter reaches said time value loaded in said register.

6. The electronic engine controller of claim 1, wherein said load sensor is in the form af an airflow meter adapted to generate an analog signal indicative of an existing value of mass air flow rate into said engine.

7. The electronic engine controller of claim 1, wherein said load sensor is in the form of a pressure sensor adapted to generate an analog signal indicative of an existing value of absolute pressure within an engine intake manifold.

8. An electronic engine controller for controlling at least one selected operation of an internal combustion engine based upon engine operating parameters, comprising:
(a) sensor means for sensing engine load and other selected engine operating parameters and generating an analog signal indicative of the value of engine load and analog signals indicative of the value of each of said other engine operating parameters;
(b) a multiplexer having inputs from said sensor means for transferring a selected one of said analog signals from said sensor means;
(c) an A/D converter for converting said analog signal transferred thereto from said multiplexer into digital form;
(d) timing control means responsive to a command signal for driving said multiplexer and said A/D converter to permit the conversion of said analog signal indicative of engine load into digital form, said timing control means adapted to drive said multiplexer and said A/D converter to permit said analog signals indicative of other engine operating parameters one by one at predetermined intervals;
(e) a speed sensor for sensing engine speed and generating a signal indicative of the value of engine speed;
(f) a reference pulse generator for sensing predetermined engine crankshaft reference position and generating reference electrical pulses every predetermined number of degrees of rotation of an engine crankshaft; and
(g) a control circuit including:
first means for determining, from said sensed value of engine speed, an offset angular position in the rotation of said engine crankshaft with respect to said engine crankshaft reference position; and
second means associated with said first means, said second means being adapted to provide said command signal to said A/D converter when said engine crankshaft rotates to said determined offset angular position.

9. The electronic engine controller of claim 8, wherein said first means is effective for determining, from said sensed value of engine speed, an angle value indicative of the number of degrees of the angular distance of said determined offset angular position from said engine crankshaft reference position, and said second means is effective for providing said command signal to said timing control means when said engine crankshaft rotates said determined angle value from said engine crankshaft reference position.

10. The electronic engine controller of claim 9, wherein said second means comprises means for generating crankshaft position electrical pulses every degree of rotation of said engine crankshaft, a register into which said determined angle value is loaded, a counter responsive to each of said reference electrical pulses for starting counting said crankshaft position electrical pulses, and a comparator for providing said command signal to said timing control means when the value of said counter reaches said angle value loaded in said register.

11. The electronic engine controller of claim 8, wherein said first means is effective for determining, from said sensed value of engine speed, a time value indicative of the time during which said engine crankshaft rotates from said crankshaft reference position to said determined offset angular position, and said second means is effective for providing said command signal to said timing control circuit when said engine crankshaft rotates for said determined time value from said engine crankshaft reference position.

12. The electronic engine controller of claim 11, wherein said second means comprises means for generating clock pulses at predetermined time intervals, a register into which said determined time value is loaded, a counter responsive to each of said reference electrical pulses for starting counting said clock pulses, and a comparator for providing said command signal to said timing control means when the value of said counter reaches said time value loaded in said register.

* * * * *